No. 767,195. PATENTED AUG. 9, 1904.
J. S. ZERBE.
APPARATUS FOR PURIFICATION OF WATER BY ELECTRICAL MEANS.
APPLICATION FILED MAY 2, 1904.
NO MODEL.
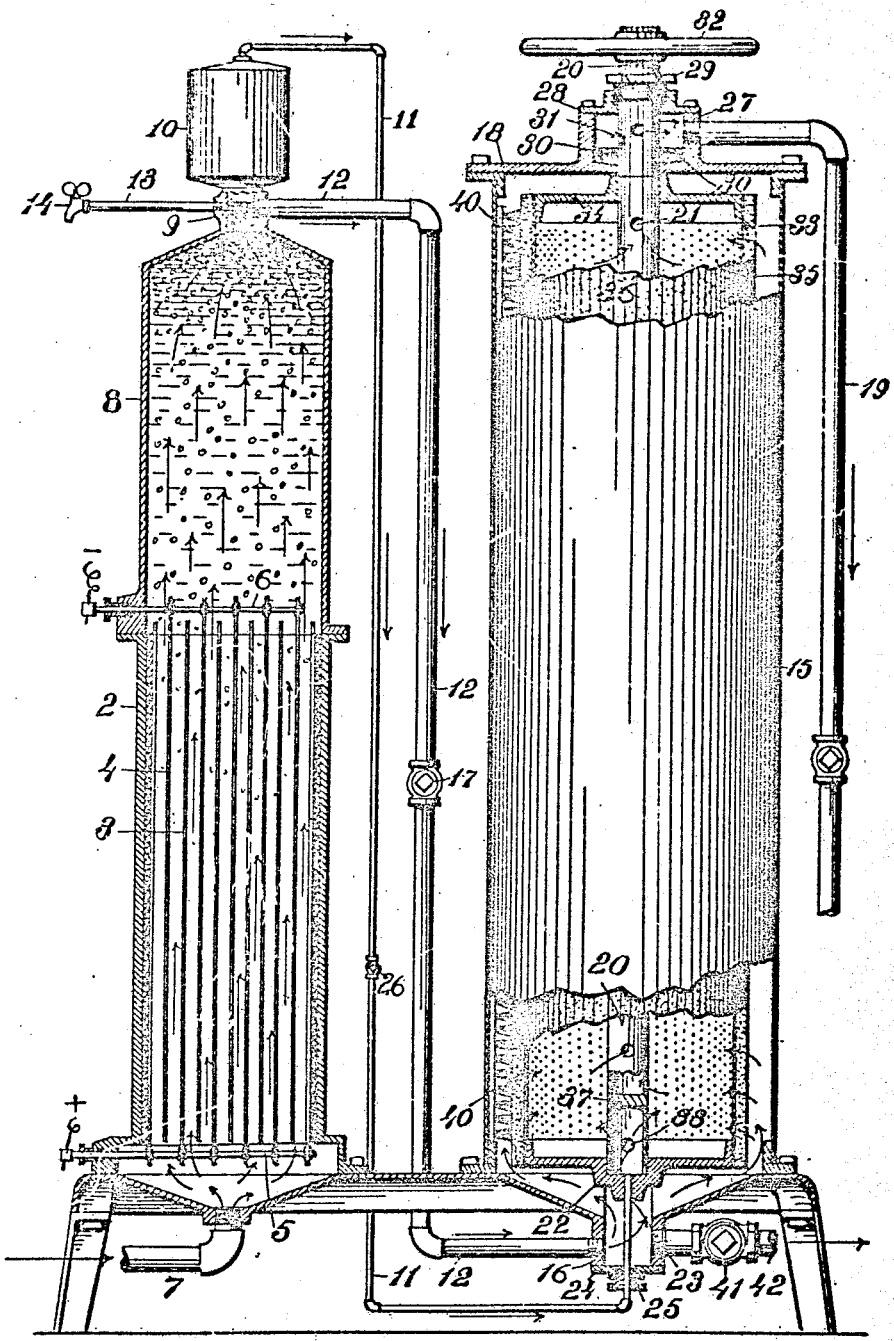
Witnesses:
M. A. Wolen
James Singleton
Inventor:
J. S. Zerbe,
By J. S. & A. J. Zerbe
Atty's No. 767,195.    Patented August 9, 1904.

UNITED STATES PATENT OFFICE.

JAMES S. ZERBE, OF NEW YORK, N. Y.

APPARATUS FOR PURIFICATION OF WATER BY ELECTRICAL MEANS.

SPECIFICATION forming part of Letters Patent No. 767,195, dated August 9, 1904.

Application filed May 2, 1904. Serial No. 206,080. (No model.)

*To all whom it may concern:*

Be it known that I, JAMES S. ZERBE, a citizen of the United States, residing at New York, in the county of New York and State of New York, have invented certain new and useful Improvements in Apparatus for Purification of Water by Electrical Means, of which the following is a specification.

The object of this invention is to provide a cheap, simple, and efficient apparatus for the purification of water; and it pertains to mechanism in which electricity is used as the agent for purifying, whereby not only the dynamic effect of the current is utilized, but in which the ozone generated is employed as an oxidizing agent. The mechanism for this purpose utilizes, first, an electrical chamber; second, an ozonizing-chamber, through which the water flows; third, an ozone-receiver for the gas, and, fourth, a filter for separating the impurities from the water. The arrangement of these chambers is such that the water enters at the lower end of the electrical chamber and flows upwardly and is then conveyed to the lower end of the filtering-chamber and in like manner flows upwardly through this chamber. At the same time provision is made by means of a pipe to convey the ozone-gas generated, or a portion of it, to the interior of the filtering-cylinder, whereby the ozone is enabled to act on the water more efficiently than would otherwise be the case, all of which will now be set forth in detail.

In the accompanying drawing, the figure is a central vertical section of the apparatus for purifying water.

2 represents the electrical chamber containing therein the electrodes 3 4, the anodes 3 being connected together at their lower ends by a bar 5 and the cathodes at their upper ends by a bar 6. At the lower end of this chamber is a pipe connection 7 for the water-supply. Above this chamber 2 is another vertically-disposed chamber 8, through which the water passes and which is herein termed the "ozonizing-chamber." I so designate it herein to distinguish it from the electrical chamber below, because while, in fact, the chamber 2 also is in a certain sense an ozonizing-chamber it contains the ozone-generator, whereas the other chamber merely acts as a disseminator for the ozone. Surmounting the chamber 8 and connected therewith by a small pipe 9 is a receiver 10, from the upper end of which is a pipe 11, leading to the filter, as will be hereinafter explained. A pipe 12 also leads from the upper end of the chamber 8 to the filter, and a pipe 13, having a valve 14, also leads from the reservoir to serve for testing purposes and also to use as a vent when emptying the chambers 2 8.

The filtering-cylinder 15 is vertically disposed and has at its lower end a base 16 to receive the pipe 12, which leads from the ozonizing-chamber 8. A valve 17 is placed in the line of this pipe, as shown. The upper end of the cylinder 15 has a removable head 18, which has a cup-shaped depression from which the discharge-pipe 19 emerges.

The cylinder which performs the filtering operation comprises an axial pipe 20, perforated at intervals, as shown at 21. The lower end of this pipe rests in a suitable socket in the base at 22, and the pipe 11 from the ozone-receiver 10 connects therewith, as shown at 23. A closure-plate 24, having a suitable stuffing-box 25, serves to prevent leakage. A valve 26 is also placed in the line of this pipe 11. The upper end of the pipe 20 passes through the cup 27 and through a cap 28, which is provided with a stuffing-box 29. At the base of the cup 27 is a packing-ring 30 and suitable packing material to prevent water from passing directly into the cup from the cylinder 15. Holes 31 through the pipe 20 serve as ducts for the water in its passage from the interior of the filtering-cylinder to the discharge-pipe 19.

Surrounding the axial pipe 20 within the cylinder 15 is a cylindrical shell 33, secured to the pipe by heads 34. This shell is suitably perforated throughout, as shown at 35, and exteriorly the shell is wrapped with felt 36 or other filtering material. Near the base of this filtering-shell the axial pipe 20 has a closure-plug 37, so that the ozone from the ozone-receiver 10 must pass from the pipe 11 through the holes 38 and thence into the interior space of the shell 33. The pressure of the ozone in the receiver is always sufficient to force the gas into the interior of the filtering-chamber. This filtering-shell is adapted to be turned by means of the hand-wheel 32 at the upper end of the pipe 20, and when thus turned the surface of the cylinder engages with a vertical brush 40, fixed to the side wall of the cylinder 15, and in that manner the accumulated impurities are removed from the filter-body. At intervals the valve 41 is opened and the impurities in the cylinder 15 are discharged through the pipe 42.

The operation of the mechanism is as follows: Water enters the machine at the inlet-pipe 7 and flows upwardly through and between the electrodes 3 4 in the electrical chamber 2, passing thence through the ozonizing-chamber 8, thence downwardly through pipe 12 to the base of the cylinder 15, passing upwardly around the filtering-cylinder 33, containing the filtering material. The pressure from the source of water-supply forces the water through the filtering material 36, so that the filtered product finally passes through the holes 21 in the inner pipe to the discharge-pipe 19. During the passage of water through the electrical chamber a considerable quantity of ozone is generated, which passes along with the treated water to the cylinder 15, where it immediately passes up through the water on the outside of the filtering-cylinder 33, so that there is always a greater or less amount of the ozone present in the space surrounding the upper end of the filtering-cylinder. My object is to inject a portion of the ozone so generated into the interior of the filtering-cylinder 33, and to this end the ozone-receiver 10 is mounted above the ozonizing-chamber 8 and connected therewith, so that the ozone will enter this receiver as fast as it is generated. Furthermore, by means of the pipe 11 I am enabled to convey the ozone or a due proportion of the amount generated, as may be necessary, directly to the water within and at the base of the filtering-shell, whereby the action of the ozone is more efficient and positive than if it is merely allowed to percolate through the water on the outside of the filtering-shell.

I also call attention to the fact that all the water within the shell 33 is filtered water, whereas the water surrounding the shell is not filtered, but has been simply electrically treated. From a bacteriological point of view I find it is very important to disseminate the ozonated air through the mass of water after as well as before it passes through the filtering medium, which process has never heretofore to my knowledge been done in an organized mechanism for purifying water, and by this means I am able practically to destroy all bacteria in water passing through the machine, as herein described.

The invention shown is particularly applicable in the treatment of water containing organic matter; but in purifying water which has little or no organic matter, but is highly impregnated with inorganic matter, the ozone-receiver and pipe 11 are not essential.

The quantity of current used to generate the ozone depends wholly on the character of water treated; but I find that one-half ampere per gallon per hour is generally sufficient for sterilization. The voltage may range from six to one hundred and ten. Low voltage is preferable in all cases, and pressure should never be greater than is necessary to drive the current through the water treated.

I employ soluble electrodes, aluminium being preferable, since the hydrate of aluminium generated from the hydrogen serves as a purifier in addition to the ozone generated from the oxygen.

I find from extended experience that the longer the water is in contact or impregnating with ozone the more perfect is its sterilization. This great oxidizing property of the ozone can be most effectively used by the intimate admixture of the gas immediately after it is generated, and to this end I provide a means for completely and effectively distributing the gas through the water not only during its passage through the electrode-case and sterilizing-chamber, but also during its passage through the filter and until it emerges therefrom.

What I claim as new is—

1. In apparatus for the purification of water by electricity, the combination of an electrical chamber having electrodes therein and immersed in the treated water and connected up with a source of electricity, an ozonating-chamber, an ozone-receiver and a filter, connected together coöperatively, substantially as described.

2. In an apparatus for the purification of water by electricity, the combination of an electrical chamber having electrodes therein and immersed in the treated water and connected up with a source of electricity, an ozonating-chamber, an ozone-receiver, and a filter, said ozonating-chamber and ozone-receiver being connected up by separate means with the filter, substantially as set forth.

3. In an apparatus for the purification of water by electricity, a chamber having therein electrodes connected up in a suitable electric circuit, and provided at its lower end with water-pipe connections, a receiver for ozone generated within the chamber, and a filter, having means for receiving water from the electrical chamber, and a pipe connection for receiving ozone from the ozone-receiver, as set forth.

4. In an apparatus for the purification of water by electricity, an electrical chamber provided with electrodes through which the treated water passes, and having means therein for generating ozone, provided with an ozone-receiver, in combination with a filter comprising an inner filter and an outer containing-cylinder, the outer cylinder being connected with the water-discharge system of the electrical chamber, and the inner filtering-cylinder with the ozone-receiver, as herein set forth.

5. In an apparatus for the purification of water by electricity, the combination of an electrical chamber having electrodes connected with a suitable source of electricity, an ozonating-chamber, an ozone-receiver and a filter, means whereby the water treated flows upwardly through the electrical chamber and the ozonating-chamber, and thence upwardly through the filtering-cylinder, and the ozone generated also passes upwardly through the ozone-receiver and filter, as set forth.

6. In an apparatus for the purification of water by electricity, the combination of an electrical chamber having electrodes connected with a source of electricity, an ozonating-chamber, an ozone-receiver, and a filter, pipe connection between the upper end of the ozonating-chamber and the lower end of the filtering-cylinder, and pipe connection with the upper end of the ozone-receiver and the lower end of the interior filtering-cylinder, and having means in said pipe connections for regulating the flow of ozone, as set forth.

7. In an apparatus for the purification of water by electricity, an electrical chamber having electrodes connected with a source of electricity, an ozonating-chamber, and an ozone-receiver, in combination with a filter comprising a shell containing an inner cylinder with filtering material thereon, pipe connections from the ozonating-chamber to the space between the lower end of the shell and the filtering-cylinder, and a pipe with valve connections between the ozone-receiver and the interior of the filter containing the filtered water, substantially as shown.

8. In an apparatus for the purification of water by electricity, a vertical shell having therein suitable electrodes connected up in an electric circuit, a vertical ozonating-chamber surrounding same, an ozone-receiver above and connected with the ozonating-chamber, and a filter operatively connected with said ozone receiver and chamber.

9. In an apparatus for the purification of water by electricity, a vertical shell having therein suitable electrodes connected up in an electric circuit, a vertical ozonating-chamber surmounting same, an ozone-receiver above and connected with the ozonating-chamber, a filter comprising an inner and an outer cylinder, a pipe connection from the upper end of the ozonating-chamber to the lower end of the outer cylinder, and a pipe connection from the upper end of the ozone-receiver to the lower end of the interior filtering-cylinder, and valves in said pipe connections between said filter and the ozone receiver and chamber.

10. In an apparatus for the purification of water by electricity, an electrical chamber having soluble electrodes therein connected with a suitable source of electricity, in combination with a filtering-cylinder, and an ozonating-chamber intermediate said electrical and filtering chambers.

11. In apparatus for the purification of water by electrolysis, an electrical chamber having soluble electrodes therein connected with a suitable source of electricity, in combination with a filtering-cylinder, and an ozonating-chamber and an ozone-receiver intermediate said electrical chamber and filtering-cylinder, and connected therewith.

12. The herein-described means of purifying water which consists in first passing the water to be treated through or between soluble electrodes in an electrical chamber, second, directing the water thus treated upwardly through an ozonating-chamber, and impregnating same with the ozone generated in the electrical chamber; third, conveying the water to the exterior of the filtering-cylinder to remove the coagulated impurities, and fourth, conveying the surplus ozone to the interior of the filtering-cylinder, as set forth.

In testimony whereof I affix my signature in presence of two witnesses.

JAMES S. ZERBE.

Witnesses:
M. A. WATSON,
JAMES SINGLETON.